United States Patent [19]
Buser et al.

[11] Patent Number: 5,606,162
[45] Date of Patent: Feb. 25, 1997

[54] MICROPROBE FOR SURFACE-SCANNING MICROSCOPES

[75] Inventors: Rudolf A. Buser; Juergen Brugger; Christian Linder, all of Neuchatel, Switzerland

[73] Assignee: British Technology Group Limited, London, England

[21] Appl. No.: 673,023

[22] Filed: Jul. 1, 1996

Related U.S. Application Data

[63] Continuation of Ser. No. 544,411, Oct. 10, 1995, abandoned, which is a continuation of Ser. No. 162,095, Apr. 26, 1994, abandoned.

[30] Foreign Application Priority Data

Jun. 13, 1991 [GB] United Kingdom ............... 911277

[51] Int. Cl.$^6$ ............... G01B 7/34; G01N 27/00
[52] U.S. Cl. ............... 250/306; 73/105
[58] Field of Search ............... 250/306; 73/105

[56] References Cited

U.S. PATENT DOCUMENTS

| | | | |
|---|---|---|---|
| 4,343,993 | 8/1982 | Binnig et al. | 250/306 |
| 4,653,326 | 3/1987 | Danei et al. | 73/517 R |
| 4,912,822 | 4/1990 | Zdeblick et al. | 250/306 |
| 5,021,364 | 6/1991 | Akamine et al. | 437/228 |
| 5,276,672 | 1/1994 | Miyazaki et al. | 250/306 |

FOREIGN PATENT DOCUMENTS

| | | |
|---|---|---|
| 0194323 | 9/1896 | European Pat. Off. . |
| 0149572 | 7/1985 | European Pat. Off. . |
| 0413041 | 2/1991 | European Pat. Off. . |
| 0413042 | 2/1991 | European Pat. Off. . |
| 0472342 | 2/1992 | European Pat. Off. . |
| 58-58780 | 4/1983 | Japan ............... 310/331 |

OTHER PUBLICATIONS

Jolly et al., "Miniature Cantilever Beams Fabricated by Anisotropic Etching of Silicon", J. Electrochem. Soc.: Solid-State Science and Technology, Dec. 1980, pp. 2750–2755.

Massood Tabib–Azar, "Optically Controlled Silicon Microactuators, Nanotechnology", 1, 1990, pp. 81–92.

Kenny et al., "A Micromachined Silicon Electron Tunneling Sensor", Proc. IEEE, 1990, pp. 192–196.

Rugar et al., "Force Microscope Using a Fiber–optic Displacement Sensor", Rev. Sci. Instrum., 59(11), Nov. 1988, pp. 2337–2340.

Kong et al., "A Micromachined Silicon Scan Tip for an Atomic Force Microscope", Proc. IEEE, 1990, pp. 28–31.

Applied Physics Letters, vol. 58, No. 1, 7 Dec. 1991 (New York, US), T. W. Kenney et al "Micromachined silicon tunnel sensor for motion detection", pp. 100–102.

Applied Physics Letters, vol. No. 20, 12 Nov. 1990, (New York, US), G. Meyer et al "Simultaneous measurement of lateral and normal forces with an optical–beam–deflection atomic force microscope", pp. 2089–2091.

Journal of vacuum Science and Technology, Part A, vol. 8, No. 4, 1 Jul. 1990 (New York, US), T. R. Albrecht et al "Microfabrication of cantilever styli for the atomic force microscope", pp. 3386–3396.

*Primary Examiner*—Jack I. Berman
*Attorney, Agent, or Firm*—Cushman, Darby & Cushman IP Group of Pillsbury Madison & Sutro LLP

[57] ABSTRACT

The invention provides, for a surface-scanning microscope, a probe having comparable stiffness in respect of deflections in two different directions, namely the direction towards and away from the surface and a direction in a plane parallel to the surface. For that purpose the probe, which comprises a support body, a resilient arm or cantilever having one end supported by the support body and another, free, end having thereon a sharp tip or stylus, has its arm or cantilever meander-shape.

The invention further provides a method making such a probe, having its support body and tip or stylus as integral parts, from a wafer of crystalline material by etching.

6 Claims, 2 Drawing Sheets

MICROPROBE FOR SURFACE-SCANNING MICROSCOPES

This is a continuation of application Ser. No. 08/544,411, filed on Oct. 10, 1995, now abandoned which is a continuation application Ser. No. 08/162,095, filed on Apr. 26, 1994, now abandoned.

This invention relates to a novel and improved form of microfabricated probe of the kind used in surface-scanning microscopes such as scanning tunnelling microscopes (STM) and atomic force microscopes (AFM).

Such microscopes incorporate a probe in the form, generally, of a resilient arm or cantilever supported at one end and provided at its other, free, end with a sharp tip or stylus which is raster-scanned across a surface being investigated. Such probes have been made of various materials, such as silicon dioxide and silicon nitride, and various manufacturing techniques have been employed, including the silicon micromachining techniques which are well known in the production of microchip electronic components and circuits.

In use of a scanning tunnelling microscope or an atomic force microscope it has hitherto been seen as desirable that the arm of the probe, though it must be resilient so that its stylus is capable of movement towards and away from the surface being scanned, should have much greater stiffness against displacement of the stylus in directions parallel to the surface. For this reason, probes have advantageously been microfabricated from thin films of, for example, silicon dioxide so as to provide a high stiffness (and correspondingly high resonant frequency) in the "x" and "y" directions, parallel to the surface being scanned, while providing a much lower stiffness (which can be selected at will during the manufacturing stage) in respect of movement of the probe tip in the "z" direction perpendicular to the surface.

Particularly in connection with atomic force microscopy, however, the possibility exists of studying the tribological (i.e. frictional) behaviour of surfaces by measuring forces acting on the probe stylus not only in the z direction but also in at least one direction, for example the y direction, parallel to the surface being investigated. That, however, requires a probe whose stiffness is comparable in both of the two directions. A cantilever arm with a square cross-section would be ideal, but it would not be practical to fabricate such an arm from thin film because its maximum thickness, of the order of 1 micrometer, would be an unrealistic limit to place on the width of the arm.

It is therefore an object of the present invention to provide a novel and improved probe, for a surface scanning microscope, having comparable stiffness in each of two different directions.

It is a further object of the invention to provide an effective method of making such a probe.

According to the invention there is provided a surface-scanning microscope probe comprising a support body, a resilient arm or cantilever having one end supported by the support body and another, free, end having thereon a sharp tip or stylus, wherein the arm or cantilever is meander-shaped.

The meander-shaped arm or cantilever may be composed of a plurality of arcuate sections disposed in a common plane and integrally connected with one another end-to-end, mutually adjacent arcuate sections being of opposite curvature; or it may be composed of a plurality of straight sections disposed in a common plane and integrally connected with one another end-to-end, mutually adjacent sections being disposed at an angle to one another to form a zig-zag meander-shape. In another embodiment, the meander-shaped arm or cantilever may comprise a plurality of straight sections extending in a common plane generally parallel to one another and transverse of the direction from the supported end to the free end of the arm, the transverse sections at their ends being integral with one another through end-connecting sections integral with the transverse sections at the ends thereof.

Preferably, such a probe is fabricated from monocrystalline silicon. Preferably, also, the sections of the cantilever arm are of substantially square and equal cross-section, though if it comprises a plurality of generally parallel transverse sections these may be of unequal lengths.

According to the invention there is also provided a method of making such a probe, including its support body and tip or stylus as integral parts thereof, from a wafer of crystalline material having opposed first and second surfaces, comprising;

providing on the first surface of the wafer a masking patch where the tip of the probe is to be formed;

providing on the first surface of the wafer, covering the said masking patch thereon, a mask of shape corresponding to the support body and cantilever arm of the probe;

subsequently or previously, etching away a region of the second surface which is opposite the masked portion of the first surface, thereby reducing the wafer thickness in that region:

etching away the first surface, other than where masked, to a depth close to the reduced thickness of the wafer at the region where etched on its second surface;

removing the masking, other than the said masking patch, from the first surface of the wafer; and continuing to etch away from the first surface of the wafer, with an etchant which undercuts the masking patch from the edges thereof to form thereunder the probe tip from the material of the wafer as an etched point thereof, while also etching through the reduced-thickness region peripherally of the material forming the cantilever arm of the probe. In a preferred example of this method, the wafer is a <100>wafer of monocrystalline silicon, the masking patch is provided by thermally growing a layer of silicon dioxide on the first surface, and the mask which is then provided on the first surface and covering the masking patch is a photoresist pattern exposed and developed in the desired shape. Etching away of the first surface where not covered by the masking is then preferably carried out by reactive ion etching using a $C_2ClF_5/SF_6$ gas mixture, and the continued etching away from the first surface after removal of the masking therefrom is preferably carried out either by dry plasma etching, using a $SF_6/O_2$ gas mixture, or a wet etching process using a mixture of nitric, acetic and hydrofluoric acids and water, preferably in proportions of, at least approximately, 35:10:10:1.

An embodiment of a probe according to the invention, and a method according to the invention of making such a probe, are described and disclosed in greater detail below with reference to the accompanying drawings, in which.

Figure 1:
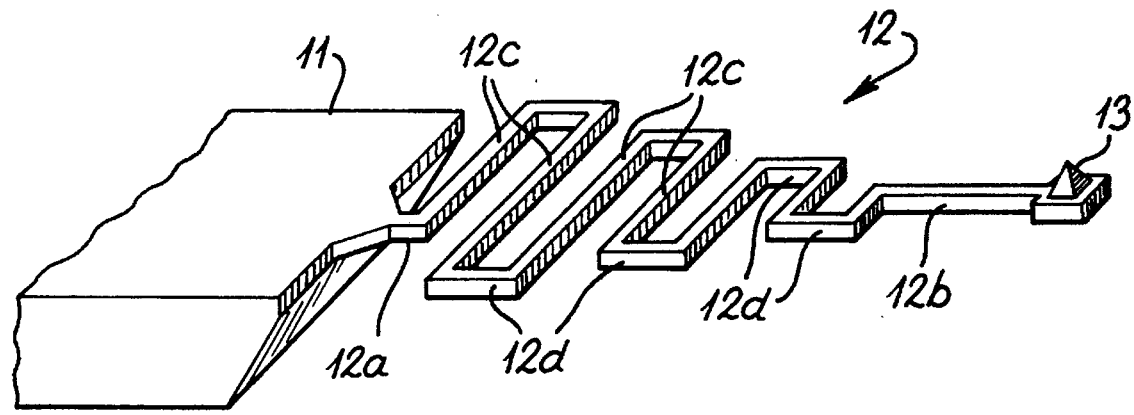
FIG. 1 is an idealised perspective view of a surface-scanning microscope probe in accordance with the invention.

The probe shown in FIG. 1 comprises a support body 11, a composite cantilever arm 12 and a sharp tip or stylus 13, all of which are formed monolithically or integrally with one another, as will be described below. The arm 12 has one end 12a which is integral with the support body 11 and is supported thereby, and its other, free end, 12b, has the tip 13 formed upon it.

Between its two ends 12a and 12b, the arm 12 is meander-shaped, being formed of a plurality of transverse sections 12c which lie in a common plane, parallel to one another, and by end-connecting sections 12d, integral with the transverse sections 12c and connecting together adjacent ends thereof. In a practical embodiment, made of monocrystalline silicon, the sections 12a, 12b, 12c and 12d of the arm 12 may all be of 14 μm×14 μm square cross-section, and the length of the arm 12 from the supporting body 11 to the tip 13 may be 700 μm. Each of the sections 12d may be of length 65 μm, and the successive sections 12c may have lengths of respectively 270, 405, 340, 275, 200, 130 and 65 μm. As may be seen more clearly from FIG. 2, the sections 12a and 12b may be out of alignment with one another, by about 65 μm, and the whole meander-shaped structure may be slightly assymmetrical.

Figure 2:
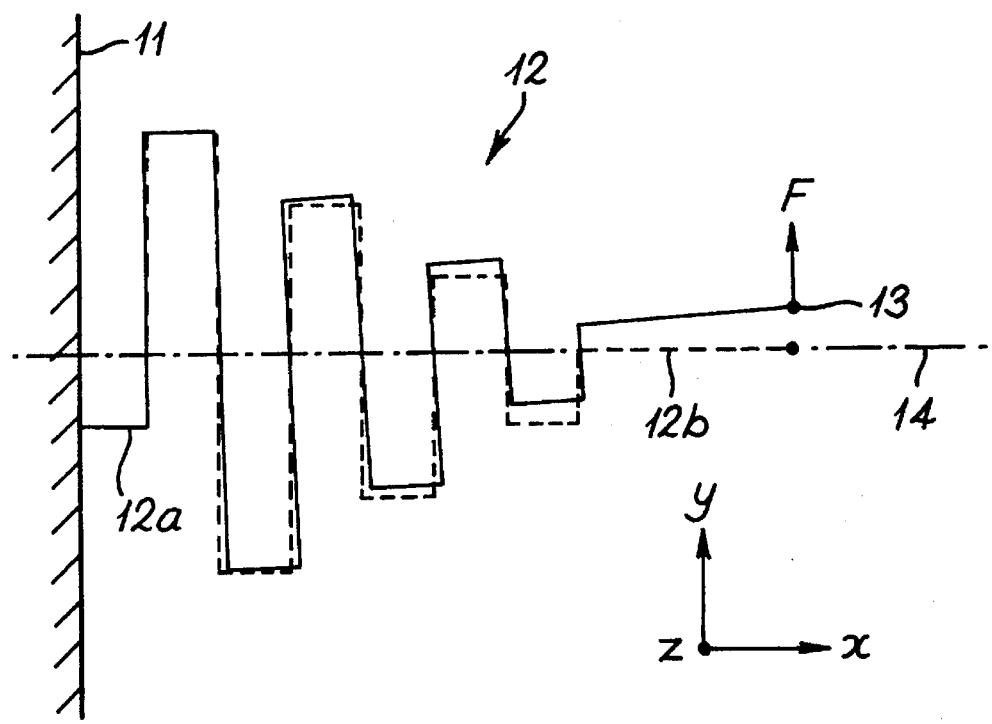
FIG. 2 is a diagram illustrating flexing of the probe shown in FIG. 1 when a tip or stylus thereof is subjected to a transverse force.

FIG. 2 shows diagrammatically the way in which the probe shown in FIG. 1 deforms when its tip 13 is subjected to a force acting parallel to the plane of the probe and in the "y" direction, perpendicular to the "x" direction, the longitudinal direction 14 of the arm 12. The positions of the sections of the arm 12 in the absence of any deforming force arm shown in broken lines, and the deformed shape under the influence of a force F in the y direction is shown in full line. The displacement of the tip 13 in the y direction due to the force F was found to be about 0.775 of its displacement in the z direction (perpendicular to the plane of FIG. 2) due to a force of equal magnitude in the z direction. This corresponds to a spring stiffness in the y direction equal to 1.29 of that in the z direction. By contrast, the spring stiffness of the arm 12 in the x direction is more than 25 times that in the z direction. Correspondingly, the resonant frequencies of the probe in the x, y and z directions were 29 kHz, 14 kHz and 12 kHz respectively. With the sections 12a and 12b of the arm 12 in alignment with one another, it was found that an undesirable degree of coupling occurred between forces and displacements in the y and z directions; but with the sections 12a and 12b offset as illustrated it was found that this coupling was satisfactorily diminished to no more than 15%.

Figure 3A:
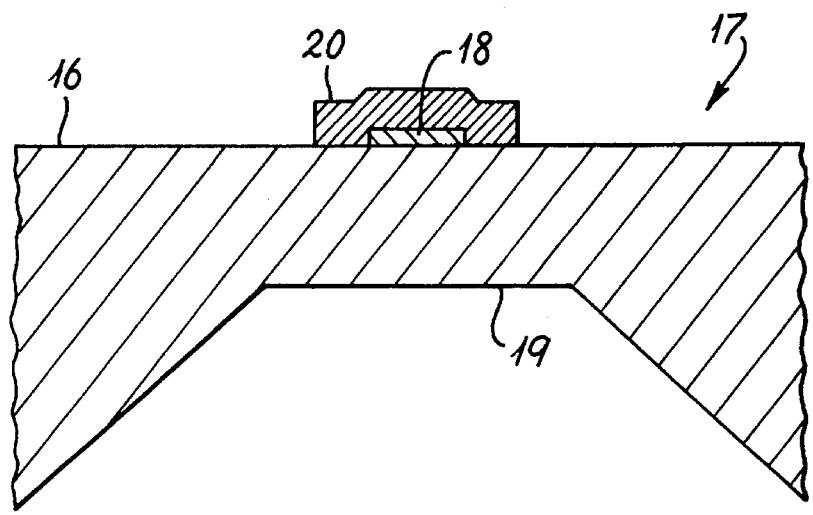
FIGS. 3a to 3c diagrammatically illustrate stages in a method according to the invention of making probes as illustrated in FIG. 1.

The probe described above is preferably made, as one of a batch of such probes, from a <100> wafer of monocrystalline silicon, which may be 280 μm thick and is polished on both sides. First, as shown in FIG. 3a, on the upper surface 16 of the wafer 17, of which only a fragment is shown, a 1.5 μm-thick layer of thermal $SiO_2$ is grown in a 8 μm×8 μm square patch 18 at each location where a tip 13 of a probe is to be formed. A similar layer of $SiO_2$ is also grown on the lower surface of the wafer (not shown), but leaving the surface uncovered where the thickness of the wafer is to be reduced to that of a membrane of about 30 μm thick at each location where the meander-shaped cantilever of a probe is to be formed. With the whole of the top surface protected by a mechanical cover or chuck (not shown), the lower surface is then etched anisotropically with 40% KOH at 60° C. to form the reduced-thickness membrane areas 19. Before or after this first etching step, a 6.5 μm-thick pattern of AZ 4562 photoresist 20 is applied to the wafer upper surface and exposed and developed to define the meandering shape of each probe, with each photoresist pattern also, as shown in FIG. 3a, covering one of the $SiO_2$ square patches 18 where a probe stylus will later be formed.

Figure 3B:
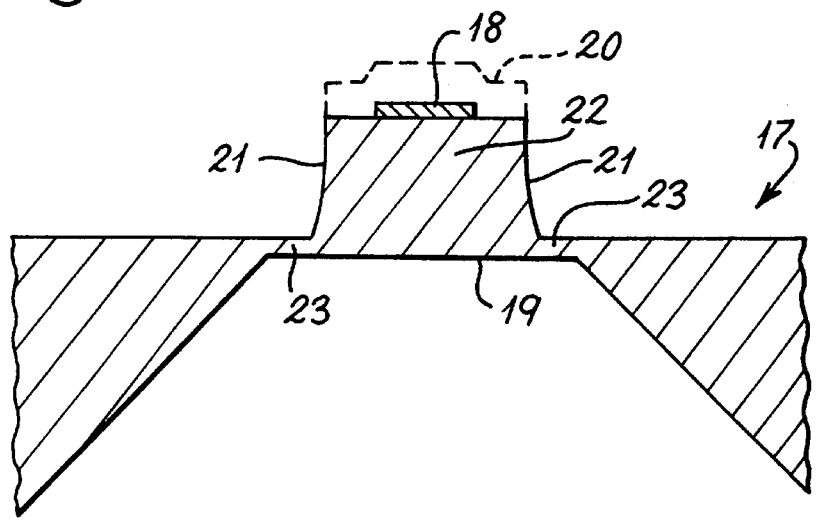

After formation of the reduced-thickness membrane areas 19, the photoresist pattern 20 serves as a mask during a reactive ion etching (RIE) step which is next applied to the upper surface 16 of the wafer 17, using a $C_2ClF_5/SF_6$ gas mixture which forms fairly vertical side walls 21 for the parts 22 of the silicon protected by the photoresist 20, as shown in FIG. 3b. The RIE step is continued until the upper surface of the wafer 17 has been etched away to such an extent that the membrane areas 19 (except at the parts 22) are present only as very thin residual ligaments 23 uniting the parts 22 to the remainder of the wafer 17.

Figure 3C:
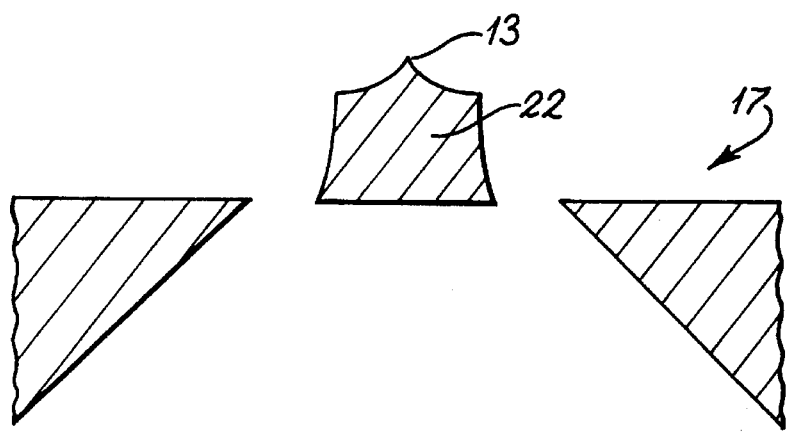

The photoresist 20 is then removed, leaving still in place the $SiO_2$ patches 18, which then serve as masks during a further etching step which may be a dry plasma etching step using $SF_6/O_2$. This gas mixture provides strong underetching, producing the required sharp silicon tip 13 (from which the masking patch 18 then separates) on the upper surface as shown in FIG. 3c, as well as etching away the ligaments 23 to free the resulting integral probe structure as shown in FIG. 1. Alternatively, this final etching to form the tip 13 may be achieved by an isotropic wet etching process using a suitable etchant such as a mixture of nitric, acetic and hydrofluoric acids and water, for example in proportions of, at least approximately, 35:10:10:1.

It will be understood that although FIG. 1 shows a probe with a cantilever of one particular meander shape, other meander shapes are also possible. For example, the cantilever may be composed of a plurality of arcuate sections lying in a common plane and integrally connected with one another end-to-end with mutually adjacent sections being of opposite curvature, or a plurality of straight sections lying in a common plane and integrally connected with one another end-to-end with mutually adjacent sections being disposed at an angle to one another to form a zig-zag meander-shape.

As noted earlier, a square-section simple cantilever arm made from a thin film of, say, silicon dioxide would not be practical because its cross-sectional dimensions would necessarily be limited to that of the thin-film thickness. However, the above-described method according to the invention enabling a meander-shaped cantilever arm with a sharp tip to be etched out of a silicon wafer can also be used to form sharp-tipped cantilever arms of other shapes, for example, a square-section simple straight arm, not limited to very small cross-sectional dimensions. It will be understood, nevertheless, that for a straight arm to be of equal stiffness with a meander-shaped arm of the same overall length, the side-length of its square cross-section would be less than that of the component sections of a meander-shaped arm.

We claim:

1. A surface-scanning microscope probe comprising a support body (11), a resilient arm or cantilever (12) having one end (12a) supported by the support body (11) and another, free, end (12b) having thereon a sharp tip or stylus (13), wherein the arm or cantilever (12) comprises a monolithic meander-shaped element.

2. A probe as claimed in claim 1, wherein the meander-shaped arm or cantilever (12) is composed of a plurality of arcuate sections disposed in a common plane and integrally connected with one another end-to-end, mutually adjacent arcuate sections being of opposite curvature.

3. A probe as claimed in claim 1, wherein the meander-shaped arm or cantilever is composed of a plurality of straight sections disposed in a common plane and integrally connected with one another end-to-end, mutually adjacent sections being disposed at an angle to one another to form a zig-zag meander-shape.

4. A probe as claimed in claim 1, wherein the meander-shaped arm or cantilever (12) comprises a plurality of straight sections (12c) extending in a common plane generally parallel to one another and transverse of the direction (14) from the supported end (12a) to the free end (12b) of the arm, the transverse sections (12c) at their ends being integral with one another through end-connecting sections (12d) integral with the transverse sections at the ends thereof.

5. A probe as claimed in any of claims 2 to 4, wherein the sections (12a, 12b, 12c, 12d) of the arm or cantilever (12) are of substantially square and equal cross-section.

6. A probe as claimed claim 1, fabricated from monocrystalline silicon.

* * * * *

UNITED STATES PATENT AND TRADEMARK OFFICE
CERTIFICATE OF CORRECTION

PATENT NO. : 5,606,162
DATED : February 25, 1997
INVENTOR(S) : BUSER et al

It is certified that error appears in the above-indentified patent and that said Letters Patent is hereby corrected as shown below:

On the title page, item [30], should read:

-- June 12, 1992 [GB] United Kingdom......PCT/GB92/01060 --

Signed and Sealed this

Fourth Day of November, 1997

Attest:

BRUCE LEHMAN

Attesting Officer    Commissioner of Patents and Trademarks